3,174,990
O-[2-HALO-1-(POLYHALOPHENYL) VINYL] ESTERS OF O,O-DIALKYL PHOSPHOROTHIOIC AND O-ALKYL ALKYLPHOSPHONOTHIOIC ACIDS
Loyal F. Ward, Jr., and Donald D. Phillips, Modesto, Calif., assignors to Shell Oil Company, New York, N.Y., a corporation of Delaware
No Drawing. Filed Jan. 25, 1963, Ser. No. 253,981
9 Claims. (Cl. 260—461)

This invention relates to a new class of phosphorus-containing esters which have been found to be particularly useful as insecticides. Members of this class have shown high activity toward a wide spectrum of insects, with particularly high activity with respect to flies, mosquitoes, caterpillars, worms and beetles. Further, members of this class have been found effective in soil, and also have been found to have a moderately long life, both in soil and on the surface of plants exposed to light and air—because of which the compounds are of particular value as insecticides for applications in which it is desired to protect plants from insects for a substantial period of time—for example, during growing and/or blooming stages—yet it is not desirable to have carry-over of the insecticide—for example, into the harvest stage and/or into the following season. Still further, compounds of this invention have been found to have relatively low mammalian toxicity, with some members having outstandingly low mammalian toxicity—so that these compounds are relatively safe to use.

The compounds of this invention can be described by the formula:

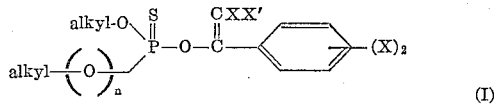

wherein alkyl represents an alkyl radical of from 1 to 4 carbon atoms, $n$ is 0 or 1, X is bromine or chlorine and X' is hydrogen, bromine or chlorine.

Referring to the halogen atoms bonded to the phenyl ring, they all may be the same, or they may be different, and they may be bonded at any combination of positions on the ring.

Compounds of this class wherein each "alkyl" radical is methyl or ethyl, and at least one of the halogen atoms is bonded to the carbon atom in the ortho position of the phenyl ring, relative to the bond joining the ring to the indicated carbon atom of the vinyl structure, appear to have the highest insecticidal activity.

To illustrate and demonstrate the character of the compounds of this invention, and their nomenclature, the following species thereof are set forth:

O,O-dimethyl O-(2-chloro-1-(2,4-dichlorophenyl)vinyl) phosphorothioate;
O,O-diethyl O-(2-chloro-1-(2,4-dichlorophenyl)vinyl) phosphorothioate;
O,O-dimethyl O-(2-bromo-1-(2,4-dichlorophenyl)vinyl) phosphorothioate;
O,O-dimethyl O-(2-chloro-1-(2,4-dibromophenyl)vinyl) phosphorothioate;
O,O-dimethyl O-(2-bromo-1-(2,4-dibromophenyl)vinyl) phosphorothioate;
O,O-dimethyl O-(2-chloro-1-(2,5-dichlorophenyl)vinyl) phosphorothioate;
O,O-diethyl O-(2-chloro-1-(2,5-dichlorophenyl)vinyl) phosphorothioate;
O,O-dimethyl O-(2-bromo-1-(2,5-dichlorophenyl)vinyl) phosphorothioate;
O,O-dimethyl O-(2-bromo-1-(2,4-dibromophenyl)vinyl) phosphorothioate;
O,O-diethyl O-(2-chloro-1-(2,4-dibromophenyl)vinyl) phosphorothioate;
O-ethyl O-(2-chloro-1-(2,4-dichlorophenyl)vinyl) methylphosphonothioate;
O-ethyl O-(2-bromo-1-(2,4-dichlorophenyl)vinyl) methylphosphonothioate;
O-ethyl O-(2-bromo-1-(2,4-dibromophenyl)vinyl) methylphosphonothioate;
O-ethyl O-(2-chloro-1-(2,4-dibromophenyl)vinyl) methylphosphonothioate;
O-ethyl O-(2-chloro-1-(2,4-dichlorophenyl)vinyl) ethylphosphonothioate;
O-methyl O-(2-chloro-1-(2,4-dichlorophenyl)vinyl) methylphosphonothioate;
O,O-dimethyl O-(2,2-dichloro-1-(2,4-dichlorophenyl) vinyl)phosphorothioate;
O,O-diethyl O-(2,2-dichloro-1-(2,4-dichlorophenyl) vinyl)phosphorothioate;
O,O-dimethyl O-(2,2-dibromo-1-(2,4-dichlorophenyl) vinyl)phosphorothioate;
O,O-dimethyl O-(2,2-dichloro-1-(2,5-dichlorophenyl) vinyl)phosphorothioate;
O,O-dimethyl O-(2,2-dibromo-1-(2,4-dibromophenyl) vinyl)phosphorothioate;
O,O-dimethyl O-(2,2-dibromo-1-(2,5-dibromophenyl) vinyl)phosphorothioate;
O,O-dimethyl O-(2,2-dichloro-1-(2,4-dibromophenyl) vinyl)phosphorothioate;
O-ethyl O-(2,2-dichloro-1-(2,4-dichlorophenyl)vinyl) methylphosphonothioate;
O-methyl O-(2,2-dichloro-1-(2,4-dichlorophenyl)vinyl) methylphosphonothioate;
O-ethyl O-(2,2-dichloro-1-(2,4-dichlorophenyl)vinyl) ethylphosphonothioate;
O-ethyl O-(2,2-dibromo-1-(2,4-dichlorophenyl)vinyl) methylphosphonothioate;
O-ethyl O-(2,2-dichloro-1-(2,4-dibromophenyl)vinyl) methylphosphonothioate;
O-ethyl O-(2,2-dibromo-1-(2,4-dibromophenyl)vinyl) methylphosphonothioate;
O-ethyl O-(2,2-dichloro-1-(2,5-dichlorophenyl)vinyl) methylphosphonothioate;
O,O-diethyl O-(1-(2-bromo-4-chlorophenyl)2-chlorovinyl)phosphorothioate;
O,O-dimethyl O-(1-(2-bromo-5-chlorophenyl)2-chlorovinyl)phosphorothioate;
O,O-dimethyl O-(1-(2-bromo-4-chlorophenyl)2-chlorovinyl)phosphorothioate;
O,O-dimethyl O-(1-(2-bromo-4-chlorophenyl)2-chlorovinyl-2,2-dichlorovinyl) phosphorothioate.

The compounds of the invention can be prepared by reaction of an appropriate alpha-haloacetophenone with an appropriate phosphoro- or phosphonohalidothionate in the presence of a base, according to the general equation:

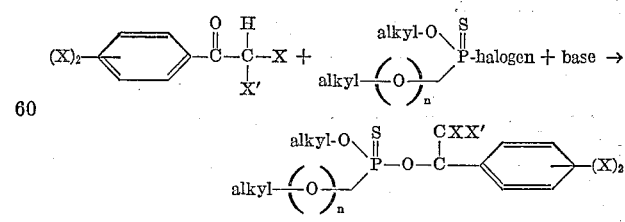

wherein the symbols have the respective meanings already set out herein.

The reaction is conveniently carried out by mixing about equimolar amounts of the reactants and base together, in a suitable solvent, at a temperature above about 0° C. The reaction has been conducted at about room temperature or slightly above (up to about 35° C.) using ether as solvent. Other solvents, such as benzene, can be used, and higher temperatures can be used. A convenient and effective technique is to add the ketone, in the solvent, to a mixture of the base and the phosphoro- or phosphonochlorido-10 thionate in the solvent, with thorough mixing. Sodium hydride is a suitable base.

The alpha-polyaloacetophenones can be prepared by halogenating the appropriate acetophenones. Alternatively, the alpha-polyhaloacetophenones can be prepared by an orthodox Friedel-Crafts ketone synthesis described generally in Fieser and Fieser, "Organic Chemistry," Second edition, 1950, at pages 576–7, by reacting the appropriate polyhalobenzene with the appropriate polyhaloacetyl chloride in the presence of aluminum chloride, then decomposing the resulting complex with ice and hydrochloric acid.

The polyhalobenzenes are a well-known class of compounds, (Lange's Handbook) as are the polyhaloacetyl chlorides (Huntress, "Organic Chlorine Compounds," Wiley 1948).

The reaction is carried out as described in Fieser and Fieser—that is, the aluminum chloride is mixed with the polyhalobenzene, then the resulting mixture is mixed with the polyhaloacetyl chloride, ordinarily at room temperatuer, the mixture is allowed to heat, or is heated to about 80–100° C., maintained at that temperature for a sufficient time to complete the formation of the complex, then the mixture is cooled and treated with an ice-hydrochloric acid mixture to decompose the complex and separate out water-soluble aluminum salts. About one mole of the acetyl chloride is used per mole of the polyhalobenzene, and ordinarily it will be found advantageous to use about a 10% excess of aluminum chloride, or about 1.1 mole per mole of the polyhalobenzene. Where the polyhalobenzene is liquid at room temperature, usually no added solvent will be required. Where the polyhalobenzene is solid at room temperature, or it is desired to maintain a more fluid mixture than can be obtained with the liquid polyhalobenzene alone, a solvent may be added, suitable solvents including carbon disulfide, nitrobenzene, nitromethane, and the like.

The ketone product ordinarily is most effectively and conveniently recovered by treating the mixture obtained on decomposition of the complex with a suitable selective solvent, ether being suitable, separating the organic phase from the aqueous phase, stripping the solvent from the organic phase, then distilling the residue to give the ketone product.

The product suitably is recovered by filtering the final crude reaction mixture, removing the solvent, then crystallizing the product from a suitable solvent, such as pentane.

The manner in which compounds of this invention are thus prepared is illustrated in the following examples, which detail preparation of typical species of these compounds. In these examples, "parts" means parts by weight unless otherwise indicated, with parts by weight bearing the same relationship to parts by volume as does the kilogram to the liter.

EXAMPLE I (A) *Preparation of O,O-diethyl O-(2-chloro-1-(2,4-dichlorophenyl)vinyl) phosphorothioate*

7.2 parts of sodium hydride as a 50% dispersion in mineral oil was mixed with 200 parts by volume of ether, and the mixture mixed, slowly over a period of one hour, with 67 parts of 2,2′,4′-trichloroacetophenone in 500 parts by volume of ether. The mixture was stirred for an additional one hour, then 68 parts of diethyl phosphorochloridothionate was added to the stirred mixture over a period of one hour. The mixture was stirred for an additional 3 hours. An additional 14 parts of the thionate was then added and the mixture stirred for an additional 16 hours. An additional 14 parts of the thionate then was added and the mixture was stirred for another 6 hours. The mixture then was poured into 200 parts by volume of water, the ether phase was separated, washed with water, and dried. The ether then was stripped and the residue was distilled. On standing the distillate crystallized. Recrystallized product had a melting point of 48.5–49.5° C. The product was identified as O,O-diethyl O-(2-chloro-1-(2,4-dichlorophenyl)vinyl) phosphorothioate by elemental analysis.

Elemental analysis (percent by weight).—Calculated: Percent P—8.25; percent S—8.5; percent Cl—28.4. Found: Percent P—8.27; percent S—8.4; percent Cl—29.0.

The identity was confirmed by infra-red spectrum analysis.

(B) In a similar manner there was prepared O,O-dimethyl O-(2-chloro-1-(2,4-dichlorophenyl)vinyl) phosphorothioate, melting point 48.5–49.5° C.

EXAMPLE II (A) *Preparation of O,O-diethyl O-(2-chloro-1-2,5-dichlorophenyl)vinyl phosphorothioate*

4.95 parts of sodium hydride as a 50% dispersion in mineral oil was mixed with 100 parts by volume of ether and over a 15 minute period 46.6 parts of diethyl phosphorochloridothionate was added. This mixture was mixed, over a 5.5 hour period, with a mixture of 46 grams of 2,2′,5′-trichloroacetophenone in 200 parts by volume of ether, the temperature being held at 28–34° C. The resulting mixture then was heated to reflux and refluxed for 1.5 hours. The mixture then was filtered and the ether stripped. The residue was extracted with pentane and O,O-diethyl O-(2-chloro-(2,5-dichlorophenyl)vinyl) phosphorothioate was recovered by crystallization. Melting point: 27.5–28.5° C. The identity of the product was established by elemental analysis and confirmed by infrared spectrum analysis.

(B) In a similar manner there was prepared O,O-dimethyl O-(2-chloro-1(2-,5-dichlorophenyl)vinyl) phosphorothioate, melting point 81–82° C.

EXAMPLE III

In essentially the same manner as described in the foregoing examples, the following additional species of the compounds of this invention were prepared:

(A) O,O-dimethyl O-(2-chloro-1-(2,4-dibromophenyl) vinyl) phosphorothioate; melting point: 55–56° C.;
(B) O,O-diethyl O-(2-chloro-1-(2,4-dibromophenyl) vinyl) phosphorothioate; melting point: 66–67° C.;
(C) O,O-dimethyl O-(2-chloro-1-(2,5-dibromophenyl) vinyl) phosphorothioate, melting point: 89–90.5° C.;
(D) O,O-dimethyl O-(2-chloro-1-(2-bromo-4-chlorophenyl)vinyl) phosphorothioate, melting point: 49–50° C.;
(E) O,O-diethyl O-(2-chloro-1-(2-bromo-4-chlorophenyl)vinyl) phosphorothioate, melting point: 54–56° C.;
(F) O-ethyl O-(2-chloro-1-(2,4-dichlorophenyl)vinyl) methylphosponothioate, boiling point: 125° C. at 0.005 Torr.;
(G) O,O-diethyl O-(2,2-dichloro-1-(2,4-dichlorophenyl) vinyl) phosphorothioate, boiling point: 125° C. at 0.005 Torr.;
(H) O,O-dimethyl O-(2,2-dichloro-1-(2,4-dichlorophenyl)vinyl) phosphorothioate, melting point: 34–5° C.;

Compounds of this invention have been found to be effective insecticides, against a variety of insects typical of various kinds of insects, including flies, mosquitoes, worms, caterpillars, weevils and beetles. These compounds are stable on storage, are essentially nonphytotoxic at insecticidally effective dosages, are effective in soil and are particularly effective against dipterous insects (flies), coleopterous insects (beetles), caterpillars and mosquitoes.

By the term "insects" thus is meant not only the members of the class Insecta, but also similar invertebrate animal organisms belonging to the allied classes of arthropods and including ticks, mites, spiders, and the like.

Compounds of this invention are effective against the immature forms of insects as well as against the mature forms which attack plants. Thus, these compounds kill "worms," by which is meant not only the true worms, but also those immature forms of insects—larvae, etc.—which are generally known as "worms," and including larvae of the western spotted cucumber beetle (*Diabrotica undecimpunctata undecimpunctata*), corn earworms (*Heliothis zea*), imported cabbage worms (*Pieris rapae*), Pacific Coast wireworms (*Limonius canus*), and the like.

The effectiveness of compounds of this invention as insecticides is demonstrated by the following experiments and the results thereof.

In the interest of brevity, in the following examples, ner, tests were conducted with respect to caterpillars of the diamondback moth (*Plutella maculipennis*), the imported cabage worm (*Pieris rapae*) and larvae of the elm leaf beetle (*Galerucella luteola*), with the results ($LC_{50}$) being set out in Table I. The activity of compounds of the invention with respect to the rice weevil (*Sitophilus oryzae*), was determined by pouring a measured amount of a solution of the test compound over adult rice weevils in a container having a perforated bottom, excess solution immediately draining away. Ten seconds after the solution had been poured on the weevils, the weevils were dried with blotter paper, transferred to containers and held in a controlled temperature and humidity room for 24 hours. Counts are then made to determine the number of weevils killed (which includes moribund weevils). Several replicates are conducted, several concentrations of the test compound in the solution being used. Table I sets out the $LC_{50}$ concentrations of compounds of the invention with respect to these weevils.

TABLE I

| Test Compound | $LC_{50}$ (percent) for Test Insect | | | | | | |
|---|---|---|---|---|---|---|---|
| | Housefly | Vinegar fly | Corn Earworm | Rice Weevil | Diamond-back moth | Imported Cabbage worm | Elm Leaf Beetle |
| Compound A | 0.0125 | [1] 1.8 | 0.0057 | 0.0018 | 0.00113 | 0.0027 | 0.00183 |
| Compound B | 0.0049 | [1] 0.43 | 0.0041 | 0.0081 | 0.00065 | 0.0031 | 0.0135 |
| Compound C | 0.048 | | 0.0086 | 0.0048 | | | |
| Compound D | 0.045 | | 0.013 | 0.0022 | | | |
| Compound E | 0.0076 | | 0.0038 | 0.00088 | | | |
| Compound F | 0.0205 | | 0.0041 | 0.0043 | | | |
| Compound G | 0.037 | | 0.027 | 0.0089 | | | |
| Compound H | 0.0058 | | 0.0034 | 0.0009 | | | |
| Compound I | 0.0155 | | 0.0043 | 0.001 | | | |
| Compound J | 0.0108 | | 0.0082 | 0.00205 | | | |
| Compound K | 0.0265 | | 0.022 | 0.0034 | | | |
| Compound L | 0.0375 | | 0.016 | | | | |

[1] Micrograms.

the species of the compounds of the invention will be referred by letter, as follows:

| Compound: | Compound of example |
|---|---|
| A | IA |
| B | IB |
| C | IIA |
| D | IIB |
| E | IIIA |
| F | IIIB |
| G | IIIC |
| H | IIID |
| I | IIIE |
| J | IIIF |
| K | IIIG |
| L | IIIH |

EXAMPLE IV

Solutions of certain of the novel compounds of the invention were made up employing either a neutral petroleum distillate boiling within the kerosene range or acetone as the solvent. Tests were carried out using the common housefly (*Musca domestica*), as the test insect, the method used being that described by Y. P. Sun, Journal of Economic Entomology, volume 43, pp. 45 et seq. (1950). Table I shows the concentration (in percent) of toxic agent in the sprayed solution required to cause 50 percent mortality of the test insect—i.e., the $LC_{50}$ concentration. Similar tests were conducted using the vinegar fly (*Drosophila melanogaster*) as the test insect. The results ($LC_{50}$) are reported in Table I. The activity of compounds of the invention with respect to the corn earworm (*Heliothis zea*), was determined by caging corn earworm larvae on cut broad bean plants inserted in water after formulations of the test compounds, prepared by dissolving acetone solutions of the compounds in water, had been sprayed thereon. Two replicates were used with each test, various tests being directed to different concentrations of the test compounds in the liquid formulations. The $LC_{50}$ values are set out on Table I. In a similar man-

EXAMPLE V

Activity of compounds of the invention with respect to the boll weevil (*Anthonomus grandis*) was established as follows: boll weevils were caged at intervals after treatment (at the rate of 0.5 pound of active material per acre) on cotton plants in the field. Three to five cages, each containing 10 weevils are placed on terminal branches of treated plants. Mortality counts were made 24–48 hours after infestation. It was found that Compound B gave 96 percent control, under such conditions.

EXAMPLE VI

Compounds of the invention also were tested to determine their toxicity with respect to mosquito (*Anopheles albimanus*) larvae as follows: sufficient of a 1% acetone solution of the test compound was dissolved in 100 milliliters of water to provide the desired concentration of the compound. Ten fourth-instar *A. albimanus* larvae were introduced into each of two replicates. The larvae were exposed to the solution of the test compound for twenty-four hours, then mortality counts were made. Various concentrations of the test compounds were used to determine the $LC_{50}$ concentration, expressed in parts by weight of test compound per million parts by weight of the solution. Table II summarizes the results.

TABLE II

| Test compound: | $LC_{50}$ |
|---|---|
| Compound A | 0.0006 |
| Compound B | 0.0016 |
| Compound C | 0.008 |
| Compound D | 0.008 |
| Compound E | 0.00176 |
| Compound F | 0.0044 |
| Compound G | 0.0071 |
| Compound H | 0.00168 |
| Compound I | 0.003 |
| Compound J | 0.0095 |
| Compound K | 0.0049 |
| Compound L | 0.0115 |

EXAMPLE VII

The residual properties of compounds of the invention were determined as follows: solutions of the test compounds in acetone were sprayed upon the surface of plywood panels and test insects caged against the treated panels, one series of exposures being made immediately after application of the test material, and later series of exposures being made at weekly intervals thereafter. The test insects were adult common houseflies (*Musca domestica*) and *Anopheles albimanus* mosquitoes. At a dosage of 50 milligrams of the test material per square foot of the surface of the wood, the following control of houseflies and mosquitoes was obtained:

Compound A: 91 percent control of houseflies at the end of 4 weeks; 100% control of mosquitoes at the end of 8 weeks;

Compound B: 100 percent control of both houseflies and mosquitoes at the end of 8 weeks;

Compound C: 94 percent control of houseflies at the end of 8 weeks and 100% control of mosquitoes at the end of 8 weeks;

Compound D: 62 percent control of houseflies at the end of 8 weeks and 100% control of mosquitoes at the end of 8 weeks;

Compound E: 97 percent control of houseflies at the end of 4 weeks and 100% control of mosquitoes at the end of 8 weeks;

Compound F: 93 percent control of houseflies at the end of 4 weeks and 100% control of mosquitoes at the end of 8 weeks;

Compound H: 100 percent control of houseflies at the end of 2 weeks with 63% control at the end of 8 weeks, and 100% control of mosquitoes at the end of 4 weeks;

Compound I: 98 percent control of houseflies at the end of 2 weeks, and 100% control of mosquitoes at the end of 4 weeks.

EXAMPLE VIII

The effectiveness and substantial life of insecticides of this invention in soil was demonstrated by the following tests:

An acetone solution of the test compound was sprayed onto soil, as the soil was being tumbled in a mixer, so as to uniformly disseminate the test compound into the soil and provide a concentration of 3.3 parts by weight of the test material per million parts by weight of the soil. The soil then was dried to remove the acetone, moistened with water and divided into jars. The jars were sealed and held at 80° F. One day after the soil had been placed in the jars, certain of the jars were opened and fourth instar larvae of the western spotted cucumber beetle (*Diabrotica undecimpunctata undecimpunctata*) were introduced into the soil. The jars were sealed, held for 24 hours, then the mortality of the larvae was determined. This procedure was repeated at intervals of 8, 15, 22, 29, 36 and 43 days after introduction of the treated soil into the jars.

The following results were obtained:

TABLE III

| Test Compound | Percent control, at indicated day after introduction of test compound into the soil | | | | | | |
|---|---|---|---|---|---|---|---|
| | 1 | 8 | 15 | 22 | 29 | 36 | 43 |
| Compound A [1] | 100 | 100 | 100 | 100 | 100 | 100 | [2] 100 |
| Compound B | 100 | 100 | 100 | | 100 | 90 | |
| Compound C | 100 | 100 | 100 | | 90 | 100 | |
| Compound D | 100 | 100 | 100 | | 37 | 40 | |
| Compound E | 100 | 100 | 100 | | 90 | 34 | |
| Compound F | 100 | 90 | 90 | | 77 | 60 | |
| Compound H | 100 | 100 | 100 | 90 | 100 | | |
| Compound I | 100 | 100 | 100 | 90 | 100 | | |
| Compound J | 100 | 100 | 100 | | 100 | 88 | |
| Compound L | 100 | 90 | 60 | | 56 | 43 | |

[1] At a dosage of 2 parts per million.
[2] 90% control at the end of 10 weeks.

EXAMPLE IX

During the conduct of these insecticidal tests, there was observed no phytotoxicity by the insecticides at the concentrations used.

The compounds of this invention can be employed for insecticidal purposes by the use of any of the techniques which are conventionally employed in the art, with due regard to the particular application contemplated—i.e., whether the compound is to be applied to the surfaces of plants, buildings and the like, and including the surface of soil, and absorptive materials such as paper, sand, bricks, concrete, plaster, plant materials used in buildings, and the like, whether it is to be disseminated into soil, whether it is to be incorporated into surface coatings, such as waxes, resins, paints, lacquers, varnishes, whether it is to be incorporated in various plastic materials, including plastic sheetings, in order to obtain packaging and wrapping materials themselves resistant to insect attack and able to protect objects packed in them from such attack, or whether it be used in some other manner such as to exploit the long life of compounds of the invention.

When a compound of this invention is to be used as a conventional insecticide applied to surfaces—of plants, buildings, soil and other absorptive materials or the like—the compound can either be sprayed or otherwise applied in the form of a solution or dispersion, or it can be absorbed on an inert, finely divided solid and applied as a dust. Useful solutions for application by spraying, brushing, dipping, and the like can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl aryl sulfonates, long-chain alkyl sulfonates, phenol-ethylene oxide condensates, $C_{12}$ to $C_{20}$ amines and ammonium salts, and the like. These solutions can be employed as such, or more preferably they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the compound of the present invention can be employed as an aerosol, as by dispersing the same into the atmosphere by means of a compressed gas.

The concentration of the compound to be used with the above carriers is dependent upon many factors, including the particular compound utilized, the carrier employed, the method and conditions of application, and the insecticide species to be controlled, a proper consideration and resolution of these factors being within the skill of those versed in the insecticide art. In general, however, the compounds of this invention are effective in concentrations of from about 0.01 to 0.5% based upon the total weight of the composition, though under some circumstances as little as about 0.00001% or as much as 2% or even more of the compound can be employed with good results from an insecticidal standpoint, as wherein high concentrations of active material are used in low-volume sprays or dusts.

Compounds of this invention are employed as soil insecticides by conventional techniques which insure uniform intimate dissemination of an effective dosage of the compound in the soil. Judging by the experimental work which has been performed, the insecticidally effective dosages of compounds of the invention lie in the range of a few parts per million parts by weight of the soil. Thus, the effective dosages appear to lie within the range of from about three to five parts, up to about fifty to one hundred parts per million, on a weight basis based on the weight of the air-dry soil. This is not to say that in some cases, a higher dosage—of up to as much as 500 parts per million on the same basis—may not be used to advantage, but in most cases the effective dosage appears to lie within the range of from about 3 to about 50 parts per million on that basis. In more practical terms, the effective dosage appears to amount to from about 0.25 to about 100 pounds of the insecticide per acre of land, depending upon the depth of soil to be treated, which may be as great as 3, 6 or 8, or even 12 inches, depending upon the particular species of plants and insecticides involved. Generally, dosages of from about 1 to about 10 pounds of the insecticide per acre of land are preferred.

The insecticide may be dissolved and/or dispersed in a suitable liquid diluent and the solution or dispersion applied to and mixed with the soil, or the insecticide may be formulated with a suitable solid carrier and applied as a dust, powder or as granules to the soil and admixed therewith. The compounds of this invention are not very soluble in water, so that water is not a suitable solvent. By the use of suitable emulsifying and dispersing agents, however, these insecticides can be emulsified or dispersed in water and the emulsion applied to the soil to be treated to provide effective control of the insects therein. Any of the usual emulsifying and dispersing agents commonly employed in forming aqueous emulsions and suspensions of water-insoluble materials can be used for this purpose. Generally but a small concentration of the emulsifying agent is required, as little as 0.05 percent of the weight of the final formulation being effective in many cases, while seldom will more than about 10% of the weight of the final formulation be required. Usually, the concentration of the emulsifying or dispersing agent will be from about 0.5 to about 5 percent of the weight of the formulation. Alternatively, or in addition, in some cases it may be to advantage to dissolve the insecticide to be used in a solvent which can readily be dispersed in water to produce a heterogeneous dispersion of the insecticide in the water.

Where the insecticide is to be applied as a solution, suitable solvents include water-miscible alcohols, ketones and aromatic hydrocarbons, such as, for example, isopropyl alcohol, benzene, acetone, methyl ethyl ketone, secondary butyl alcohol, kerosene, chlorinated hydrocarbons, various non-phytotoxic hydrocarbon fractions which are ordinarily used in disseminating agricultural chemicals, including spray oils, horticultural oils, and the like.

The suitable solid carriers ordinarily are those which are essentially inert in the soil and which are not hygroscopic—for if they are hygroscopic the final formulation will not remain dry and free-flowing. In some cases, however, it may be desirable to employ as carrier a solid which is not inert—as, for example, a solid fertilizer such as a commercial mixed solid fertilizer, rock phosphate, urea or the like. Suitable inert carriers are those well known to the art including the clays such as the kaolinites, the bentonites and the attapulgites; other minerals in natural state such as talc, pyrophyllite, quartz, diatomaceous earth, fuller's earth, chalk, rock phosphate and sulfur; and chemically modified minerals, such as acid washed bentonites, precipitated calcium phosphates, precipitated calcium carbonate and colloidal silica. These diluents may represent a substantial portion, for example, 50 to 98 percent by weight of the entire formulation.

These solid formulations can be prepared by grinding or air-milling the carrier and insecticide together. Alternatively, the solid formulations can be formed by dissolving the insecticide in a suitable solvent, such as a volatile solvent, impregnating and/or coating the particles with the solution and if necessary, removing the solvent. The formulation also can be effected by melting the insecticide and mixing the molten insecticide with the carrier. Granular formulations can be prepared by impregnating and/or coating granules of the carrier with the insecticide or by forming granules of mixtures of the insecticide and carrier.

From the standpoint of mechanims, the insecticide, neat or as a formulation, is applied to the soil in any manner which enables its intimate admixture with the soil to be treated. Thus the insecticide, which includes formulations thereof, can be applied to the surface of the soil, or it can be applied below the surface of the soil, and then admixed with the soil. If in the form of a liquid formulation, the insecticide can be drenched onto the surface of the soil or injected into the soil. In other words, conventional means, well known in the art, can be used to effect intimate admixture of the insecticide with the soil to be treated.

The compounds of this invention are characterized by an extended effective life in the soil and essentially no phytotoxicity at the insecticidally effective dosages. Consequently, it may not in all cases be necessary to treat the entire mass of insect-infested soil—in some cases, it may be sufficient to treat only the soils of the rhizosphere of the plants to be protected. Thus, the soil immediately surrounding the roots of established trees can be treated to protect the trees, and row crops can be protected by treating only the soil which will surround the roots of the plants in each before the seeds or plants are planted, or after the plants have been planted. The formulations of the insecticide can also contain other materials, such as nematocides, fungicides, insecticides of different action and/or different physical characteristics, hormones, and/or fertilizers to form multipurpose compositions.

We claim as our invention:
1. A phosphorus ester of the formula

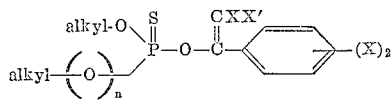

wherein alkyl represents alkyl of from 1 to 4 carbon atoms, $n$ is an integer from 0 to 1, X is a member of the group consisting of bromine and chlorine, and X' is a member of the group consisting of hydrogen, bromine and chlorine.

2. Esters of claim 1 wherein $n=1$, X' is hydrogen.

3. O,O-diethyl O-(2-chloro-1-(2,4-dichlorophenyl)-vinyl)phosphorothioate.

4. O,O-dimethyl O-(2-chloro-1-(2,4-dichlorophenyl)-vinyl)phosphorothioate.

5. O,O-dimethyl O-(2-chloro-1-(2,4-dibromophenyl)-vinyl)phosphorothioate.

6. O,O-dimethyl O-(2-chloro-1-(2-bromo-4-chlorophenyl)vinyl)phosphorothioate.

7. O,O-dimethyl O-(2-chloro-1-(2,5-dichlorophenyl)-vinyl)phosphorothioate.

8. O-ethyl O-(2-chloro-1-(2,4-dichlorophenyl)vinyl)-methylphosphonothioate.

9. O,O-diethyl O-(2-chloro-1-(2-bromo-4-chlorophenyl)vinyl)phosphorothioate.

References Cited by the Examiner
UNITED STATES PATENTS

| | | |
|---|---|---|
| 2,956,073 | Whetstone et al. | Oct. 11, 1960 |
| 3,003,916 | Gilbert et al. | Oct. 10, 1961 |
| 3,027,296 | Whetstone | Mar. 27, 1962 |
| 3,079,417 | Farrar | Feb. 26, 1963 |
| 3,089,893 | Dever et al. | May 14, 1963 |
| 3,091,565 | Suzuki | May 28, 1963 |
| 3,094,457 | Birum | June 18, 1963 |
| 3,102,842 | Phillips et al. | Sept. 3, 1963 |